Patented May 20, 1947

2,420,862

UNITED STATES PATENT OFFICE 2,420,862

STABILIZATION OF VINYL AROMATIC COMPOUNDS WITH GASEOUS DIOLEFINS OR ACETYLENES

Thomas S. Chambers, Newark, N. J., assignor to Standard Oil Development Company, a corporation of Delaware No Drawing. Application September 30, 1943, Serial No. 504,435

8 Claims. (Cl. 260—666.5)

This invention pertains to the stabilization of vinyl aromatic compounds, particularly styrene, against polymerization.

In the production, handling or storage of unsaturated compounds, particularly vinyl aromatic compounds such as styrene and the like, it has been found that these compounds readily undergo polymerization as shown by the increase in viscosity of the products. This polymerization is highly objectionable, particularly when these products are to be used for the production of synthetic rubber-like emulsion copolymerizates with diolefinic hydrocarbons such as butadiene, isoprene and the like since it has been found that the desired properties in the finished rubber-like materials are only obtained if monomeric styrene is utilized. Accordingly, it is common practice at present to inhibit vinyl aromatic compounds such as styrene against polymerization during handling and storage by the addition of compounds which are normally solid or liquid under the conditions of operation. Such compounds have been indicated in the literature as including benzoquinone, sulfur, aromatic nitro compounds, anthracene, methyl aniline, pyrogallol and other polyhydric phenols, naphthylamine, hydrazobenzene, phenanthraquinone, picric acid, phenyl-beta-naphthylamine, 1,5-dihydroxy napthalene, guaiacol, picramide, dinitrobenzene, trinitrobenzene, hexamine and 1.2-diaminopropane. In addition it has been proposed to inhibit polymerization or degradation of these compounds by adding thereto low molecular weight hydrocarbon gases such as propane, propylene, butane and butylene. It has also been proposed to prevent oxygen- or peroxide-catalyzed polymerization or oxidative degradation of these compounds by maintaining an oxygen-free atmosphere in contact with them.

The use of the foregoing inhibitors or stabilizers has been attended with numerous inconveniences or disadvantages. Certain of the ordinary inhibitors such as sulfur, aromatic nitro compounds and the like, can only be separated from the styrene when it is desired to subject the same to polymerization by subjecting the inhibitor-containing styrene to a careful distillation. Also, for the most part, the ordinary inhibitors are sufficiently non-volatile so that they do not provide any protection in the distillation column. While low molecular weight hydrocarbon gases such as propane, butane and the like are volatile and may therefore be easily separated from the styrene and may easily be diffused throughout the distillation column, they have been found to be unsatisfactory as stabilizing agents because they are ineffective as polymerization inhibitors at distillation temperatures.

It is the object of the present invention to provide the art with a novel method of stabilizing vinyl aromatic compounds.

It is a further object of this invention to provide the art with a method of effectively inhibiting vinyl aromatic compounds against polymerization with materials that are easy to apply, easy to control, easy to remove or which may, if desired, be permitted to remain in or associated with the said vinyl aromatic compounds up to their use in the production of emulsion polymerizates.

These and other objects will appear more fully from the detailed description and claims which follow.

It has now been found that vinyl aromatic compounds such as styrene may be effectively stabilized or inhibited against polymerization by treating the same with highly volatile dienes or acetylenes, including acetylene ($C_2H_2$) and its homologues. Compounds which may be used as inhibitors include aliphatic conjugated diolefins such as butadiene, isoprene and piperylene and their homologues. These compounds are all characterized by high volatility relative to the compounds which are to be stabilized thereby. For example, the inhibitors to be used with styrene should have a boiling point below that of styrene and preferably below about 10 to 30° C. They may therefore be applied to the aromatic compounds in an extremely simple manner as by bubbling them through the compound to be inhibited. Advantages are also attached to the use of a gas as inhibitor both for storage and for distillation since in both cases removal of the gas may be accomplished more conveniently than the removal of either solid or liquid inhibitors. For storage, the gaseous inhibitors offer the additional advantage of avoiding the necessity of using an inert atmosphere, while for distillation, they have the advantage of providing protection throughout all parts of the distillation system. The last named feature is important, since protection in distillation columns is accomplished at present usually by adding a suitable solution of inhibitor near the top of the column and allowing it to descend in contact with the refluxing styrene or other vinyl aromatic compounds.

The present invention may be applied to stabilize a wide variety of vinyl aromatic compounds such as styrene, nuclearly alkylated or halogenated styrenes, vinyl naphthalene and nuclearly alkylated or halogenated vinyl naphthalenes.

The gaseous inhibitors may be applied to the compounds to be stabilized in various ways. Thus, the inhibitor may be bled into the base of a fractionating column and taken out at the head while inhibiting the contents of the still pot by the addition of one of the well-known liquid or solid inhibitors. Alternatively, the gas may be admitted into the body of liquid in the still pot, allowed to ascend through the column and either be drawn off at some subsequent point or allowed to remain in contact with the styrene to afford protection in storage. Butadiene is especially desirable as an inhibitor for styrene particularly when the latter is to be copolymerized with butadiene as in the production of "Buna-S" type emulsion polymers since it may be permitted to remain in the styrene without hindering the subsequent polymerization reaction or requiring the addition of extra large amounts of polymerization catalysts. The inhibitor is usually applied in amounts up to the limit of solubility of the inhibitor in the vinyl aromatic compound under the temperature and pressure applied.

The following example is illustrative of my invention but it will be understood that my invention is not limited thereto.

*Example 1*

Redistilled pure styrene was treated with gaseous butadiene by bubbling a slow stream of the latter through the liquid styrene at 90° C. Measurements of relative viscosity were made from time to time in a capillary viscometer. Under these conditions there was no change in the relative viscosity of the styrene in the first 30 minutes. At the end of 100 minutes the relative viscosity of the styrene had increased 33%.

Under the same conditions pure styrene without butadiene in admixture gave an increase in relative viscosity of almost 200% in 30 minutes and more than 1000% in 100 minutes.

Redistilled pure styrene was also treated by passing gaseous isobutane in a slow stream through the liquid styrene at 90° C. while measurements of relative viscosity were made from time to time as above. The increase in viscosity after 30 minutes amounted to 25% and after 100 minutes amounted to 350% (average of two runs under identical conditions).

It may be seen, therefore, that butadiene is much more effective as a stabilizer for styrene than isobutane, particularly at elevated temperatures.

The foregoing description contains a limited number of embodiments of the present invention but it will be understood that they have been given by way of illustration since numerous variations are possible without departing from the scope of the claims which follow.

What I claim and desire to secure by Letters Patent is:

1. The process of stabilizing vinyl aromatic compounds which comprises dissolving therein as a stabilizer a member of the group consisting of aliphatic conjugated diolefins and acetylenes having boiling points below about 10–30° C., in an amount up to the limit of solubility of the stabilizer in the vinyl compound.

2. The process of stabilizing vinyl aromatic compounds which comprises dissolving therein as a stabilizer a member of the group consisting of aliphatic conjugated diolefins and acetylenes which boils below about 10–30° C. and is gaseous at the temperature of stabilization, in an amount up to the limit of solubility of the stabilizer in the vinyl compound.

3. The process as claimed in claim 2 which comprises saturating the liquid vinyl aromatic compound with a gaseous member of said group by bubbling the latter through said liquid compound up to the limit of solubility.

4. The process of stabilizing vinyl aromatic compounds which comprises dissolving a gaseous acetylene as a stabilizer in the liquid vinyl compound, in an amount up to the limit of solubility of the stabilizer in the vinyl compound.

5. The process of stabilizing vinyl aromatic compounds which comprises bubbling gaseous butadiene-1,3 through the liquid vinyl compound, in an amount up to the limit of solubility of butadiene in the vinyl compound.

6. The process of stabilizing styrene which comprises dissolving therein a butadiene homologue having a boiling point below about 10°–30° C., in an amount up to the limit of solubility of butadiene in the styrene.

7. The process of stabilizing styrene which comprises bubbling gaseous butadiene-1,3 through the liquid styrene, in an amount up to the limit of solubility of butadiene in the styrene.

8. The process of stabilizing styrene which comprises bubbling gaseous acetylene through the liquid styrene in an amount up to the limit of solubility of acetylene in styrene.

THOMAS S. CHAMBERS.

REFERENCES CITED

The following references are of record in the file of this patent:

UNITED STATES PATENTS

| Number | Name | Date |
|---|---|---|
| 2,336,259 | King et al. | Dec. 7, 1943 |
| 2,241,770 | Dreisbach et al. | May 13, 1941 |
| 2,215,255 | Stoesser et al. | Sept. 17, 1940 |
| 2,376,549 | Mavity | May 22, 1945 |

OTHER REFERENCES

Ziegler, Rubber Chem. and Tech., vol. 11, p. 503 (1938).